United States Patent
Inazawa et al.

(10) Patent No.: US 12,143,709 B2
(45) Date of Patent: Nov. 12, 2024

(54) IMAGING APPARATUS

(71) Applicant: CANON KABUSHIKI KAISHA, Tokyo (JP)

(72) Inventors: Keisuke Inazawa, Tokyo (JP); Toshimichi Ise, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 48 days.

(21) Appl. No.: 18/066,941

(22) Filed: Dec. 15, 2022

(65) Prior Publication Data

US 2023/0209177 A1  Jun. 29, 2023

(30) Foreign Application Priority Data

Dec. 23, 2021  (JP) ................. 2021-209073

(51) Int. Cl.
| | |
|---|---|
| *H04N 23/63* | (2023.01) |
| *G03B 17/14* | (2021.01) |
| *H04N 13/232* | (2018.01) |
| *H04N 23/55* | (2023.01) |
| *H04N 23/62* | (2023.01) |
| *H04N 23/667* | (2023.01) |

(52) U.S. Cl.
CPC ........... *H04N 23/633* (2023.01); *H04N 23/55* (2023.01); *H04N 23/62* (2023.01); *H04N 23/667* (2023.01); *G03B 17/14* (2013.01); *H04N 13/232* (2018.05)

(58) Field of Classification Search
None
See application file for complete search history.

(56) References Cited

U.S. PATENT DOCUMENTS

| | | | | |
|---|---|---|---|---|
| 2002/0021354 A1* | 2/2002 | Suzuki | ................. | H04N 13/122 |
| | | | | 348/E13.067 |
| 2015/0161761 A1* | 6/2015 | Maeda | ................... | H04N 23/64 |
| | | | | 348/374 |
| 2018/0262689 A1* | 9/2018 | Yasuda | .................. | H04N 23/63 |
| 2022/0345642 A1* | 10/2022 | Nakagawa | .......... | H04N 23/632 |
| 2022/0385828 A1* | 12/2022 | Okuwaki | .............. | H04N 23/62 |
| 2022/0385829 A1* | 12/2022 | Kinoshita | ............ | H04N 23/635 |
| 2022/0385830 A1* | 12/2022 | Shoda | ................. | H04N 5/2628 |
| 2022/0385877 A1* | 12/2022 | Kimata | ............... | H04N 23/632 |
| 2022/0385882 A1* | 12/2022 | Aiba | ..................... | H04N 13/207 |
| 2022/0400208 A1* | 12/2022 | Takao | .................. | H04N 23/635 |
| 2022/0400243 A1* | 12/2022 | Shoji | ..................... | H04N 23/60 |

(Continued)

FOREIGN PATENT DOCUMENTS

| | | | |
|---|---|---|---|
| EP | 1154314 A2 * | 11/2001 | ............... G01C 9/28 |
| JP | 2012060567 A | 3/2012 | |

*Primary Examiner* — Paul M Berardesca
(74) *Attorney, Agent, or Firm* — Canon U.S.A., Inc. IP Division (57) ABSTRACT

An imaging apparatus capable of attaching and detaching a lens unit, includes: a processor; and a computer-readable medium storing instructions which, when executed by the processor, cause the imaging apparatus to detect a tilt of the imaging apparatus, acquire information on a type of the lens unit attached on the imaging apparatus, perform control to display an image captured using an optical system of the lens unit on the screen, and perform control to superimpose and display an item indicating the detected tilt on the image based on the acquired information, wherein the item is displayed at different positions depending on whether the lens unit includes a plurality of optical systems.

15 Claims, 6 Drawing Sheets

(56) References Cited

U.S. PATENT DOCUMENTS

| | | | |
|---|---|---|---|
| 2023/0281768 A1* | 9/2023 | Mizuno | H04N 13/302 |
| | | | 382/168 |
| 2023/0300453 A1* | 9/2023 | Seki | H04N 23/611 |
| | | | 348/49 |
| 2023/0412931 A1* | 12/2023 | Yoshizawa | H04N 23/63 |
| 2024/0020073 A1* | 1/2024 | Imaizumi | G06F 3/14 |

* cited by examiner

IMAGING APPARATUS

BACKGROUND

Technical Field

The present disclosure relates to an imaging apparatus.

Description of the Related Art

Japanese Patent Application Publication No. 2012-60567 discloses a technique for visually notifying a photographer of the orientation of an imaging apparatus by detecting the orientation (tilt) of the imaging apparatus and superimposing and displaying a spirit level indicating the detected orientation on a live image on a display surface.

However, in an interchangeable-lens camera, the optimal display position of a spirit level may differ depending on the type of lens unit to be attached. For example, when a single-eye lens unit is attached, by displaying a spirit level in the end portion of a display surface corresponding to the peripheral portion of one captured live image, a spirit level can be displayed without impairing the visibility of the live image. Meanwhile, when a compound-eye lens unit including a plurality of optical systems is attached, the visibility of the live image is impaired if the spirit level is displayed at the same position (end portion of the display surface) as when a single-eye lens unit is attached. As an example, a case can be considered in which a twin-eye lens unit is attached, and two live image areas A and B captured respectively using the two optical systems of the twin-eye lens unit are displayed side by side on the display surface. In this case, where the spirit level is displayed at the same position as when the single-eye lens unit is attached, the spirit level is displayed so that visual recognition of the live image area A is impeded (for example, in the center of the live image area A) and the visibility of the live image area A may be impaired. Also, in this case, the spirit level may be displayed at a position far from the live image area B. When the spirit level is displayed at a position far from the live image area B, the user has to move the line of sight greatly in order to compare the spirit level and the live image area B, so that the user cannot easily compare the spirit level and the live image area B.

SUMMARY

The present disclosure provides a technique that makes it possible to display an item indicating the tilt of an imaging apparatus at a suitable position both when a lens unit including a plurality of optical systems is attached to the imaging apparatus and when it is not.

An imaging apparatus according to some embodiments of the present disclosure, capable of attaching and detaching a lens unit, includes: a processor; and a computer-readable medium storing instructions which, when executed by the processor, cause the imaging apparatus to detect a tilt of the imaging apparatus, acquire information on a type of the lens unit attached on the imaging apparatus, perform control to display an image captured using an optical system of the lens unit on the screen, and perform control to superimpose and display an item indicating the detected tilt on the image based on the acquired information, wherein the item is displayed at different positions depending on whether the lens unit includes a plurality of optical systems.

Further features of the present disclosure will become apparent from the following description of exemplary embodiments with reference to the attached drawings.

DESCRIPTION OF THE EMBODIMENTS

Embodiments of the present disclosure will be described below with reference to the drawings. In the following embodiments, an example in which the present disclosure is applied to a digital camera (interchangeable lens type camera) capable of attaching and detaching a lens unit will be described.

First Embodiment

Figure 1A:
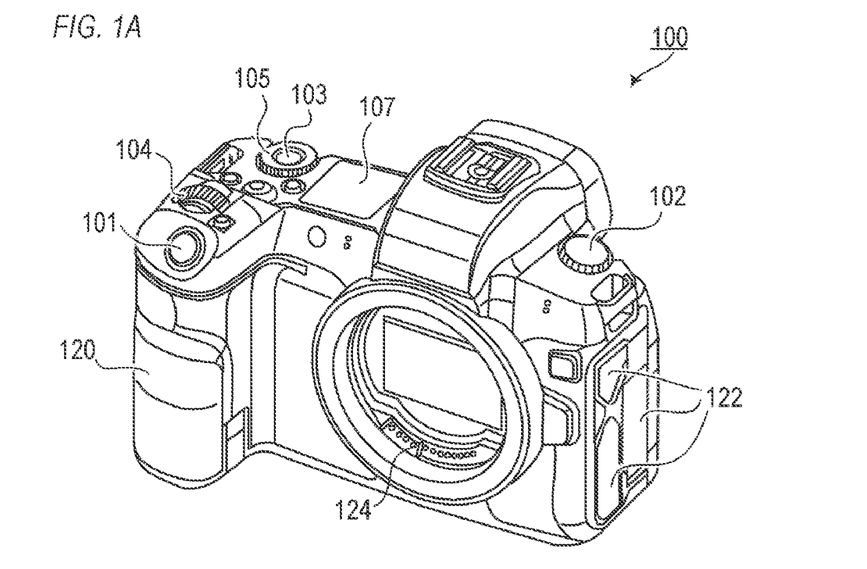
FIGS. 1A and 1B are external views of a camera.
Figure 1B:
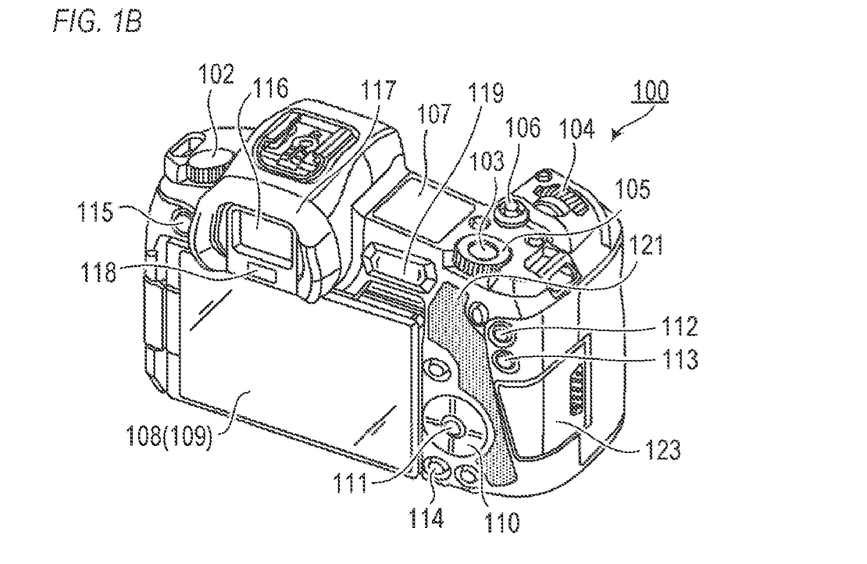

FIGS. 1A and 1B are external views showing an example of the external appearance of a digital camera (camera) 100 according to the first embodiment. FIG. 1A is a perspective view of the camera 100 viewed from the front side, and FIG. 1B is a perspective view of the camera 100 viewed from the rear side.

The camera 100 has a shutter button 101, a power source switch 102, a mode changeover switch 103, a main electronic dial 104, a sub electronic dial 105, a moving image button 106, and a finder external display unit 107 on the upper surface. The shutter button 101 is an operation member for issuing an imaging preparation instruction or an imaging instruction. The power source switch 102 is an operation member for switching the power source of the camera 100 between ON and OFF. The mode changeover switch 103 is an operation member for switching between various modes. The main electronic dial 104 is a rotary operation member for changing setting values, such as shutter speed and aperture. The sub electronic dial 105 is a rotary operation member for moving a selection frame (cursor), performing image feed, and the like. The moving image button 106 is an operation member for instructing the start and stop of moving image imaging (recording). The finder external display unit 107 displays various setting values, such as shutter speed and aperture.

The camera 100 has a display unit 108, a touch panel 109, a direction key 110, a SET button 111, an AE lock button 112, an enlargement button 113, a playback button 114, a menu button 115, an eyepiece unit 116, an eye proximity detection unit 118, and a touch bar 119 on the back surface. The display unit 108 displays images and various information. The touch panel 109 is an operation member that detects a touch operation on the display surface (touch operation surface) of the display unit 108. The direction key 110 is an operation member composed of keys (four-direction keys) that can be pressed up, down, left, and right. Processing can be performed according to the pressed position of the direction key 110. The SET button 111 is an operation member that is mainly pressed when determining a selection item. The AE lock button 112 is an operation member that is pressed when fixing an exposure state in an imaging standby state. The enlargement button 113 is an operation member for switching between ON and OFF of the enlargement mode in a live view display (LV display) of the imaging mode. When the enlargement mode is ON, operating the main electronic dial 104 enlarges or reduces the live view image (LV image). Also, the enlargement button 113 is used when enlarging a playback image or increasing the enlargement ratio in a playback mode. The playback button 114 is an operation member for switching between the imaging mode and the playback mode. Pressing the playback button 114 in the imaging mode causes a transition to the playback mode, and the latest image among images recorded on a recording medium 227 (to be described hereinbelow) can be displayed on the display unit 108.

The menu button 115 is an operation member that is pressed to display a menu screen on which various settings can be made on the display unit 108. The user can intuitively perform various settings by using the menu screen displayed on the display unit 108, the direction key 110, and the SET button 111. The eyepiece unit 116 is a part for looking into an eyepiece finder (looking-in type finder) 117 with an eyepiece. The user can visually recognize video displayed on an EVF 217 (Electronic View Finder), which will be described hereinbelow, inside the camera 100 through the eyepiece unit 116. The eye proximity detection unit 118 is a sensor that detects whether the user is eyeing the eyepiece unit 116 (eyepiece finder 117).

The touch bar 119 is a line-shaped touch operation member (line touch sensor) capable of receiving touch operations. The touch bar 119 can be touch-operated with the thumb of the right hand when a grip portion 120 is gripped with the right hand so that the shutter button 101 can be pressed with the index finger of the right hand (with the little finger, ring finger, and middle finger of the right hand). That is, the touch bar 119 can be operated in a state (imaging orientation) in which the user looks into the eyepiece finder 117, looks into the eyepiece unit 116, and is ready to press the shutter button 101 at any time. The touch bar 119 can receive a tap operation (an operation of touching and releasing the touch bar 119 without moving the touch position within a predetermined period), a left/right slide operation (an operation of touching and then moving the touch position), and the like. The touch bar 119 is an operation member different from the touch panel 109 and does not have a display function. The touch bar 119 functions, for example, as a multi-function bar (M-Fn bar) to which various functions can be assigned.

The camera 100 also has the grip portion 120, a thumb rest portion 121, a terminal cover 122, a lid 123, a communication terminal 124, and the like. The grip portion 120 is a holding portion formed in a shape that allows the user to easily hold the camera 100 with his or her right hand. The shutter button 101 and the main electronic dial 104 are arranged at positions enabling operation with the index finger of the right hand while the camera 100 is held by gripping the grip portion 120 with the little finger, ring finger and middle finger of the right hand. Also, in a similar state, the sub electronic dial 105 and the touch bar 119 are arranged at positions that enable operation with the thumb of the right hand. The thumb rest portion 121 (thumb standby position) is a grip portion provided on the rear side of the camera 100 where the thumb of the right hand holding the grip portion 120 can be easily placed without operating any operation member. The thumb rest portion 121 is made of a rubber member or the like for enhancing holding power (grip feeling). The terminal cover 122 protects a connector, such as a connection cable, that connects the camera 100 to an external equipment (external device). The lid 123 protects the recording medium 227 and a slot for storing the recording medium 227, which will be described hereinbelow, by closing the slot. The communication terminal 124 is for communicating with a lens unit (a lens unit 200 and a lens unit 300 to be described hereinbelow) that can be attached to and detached from the camera 100.

Figure 2:
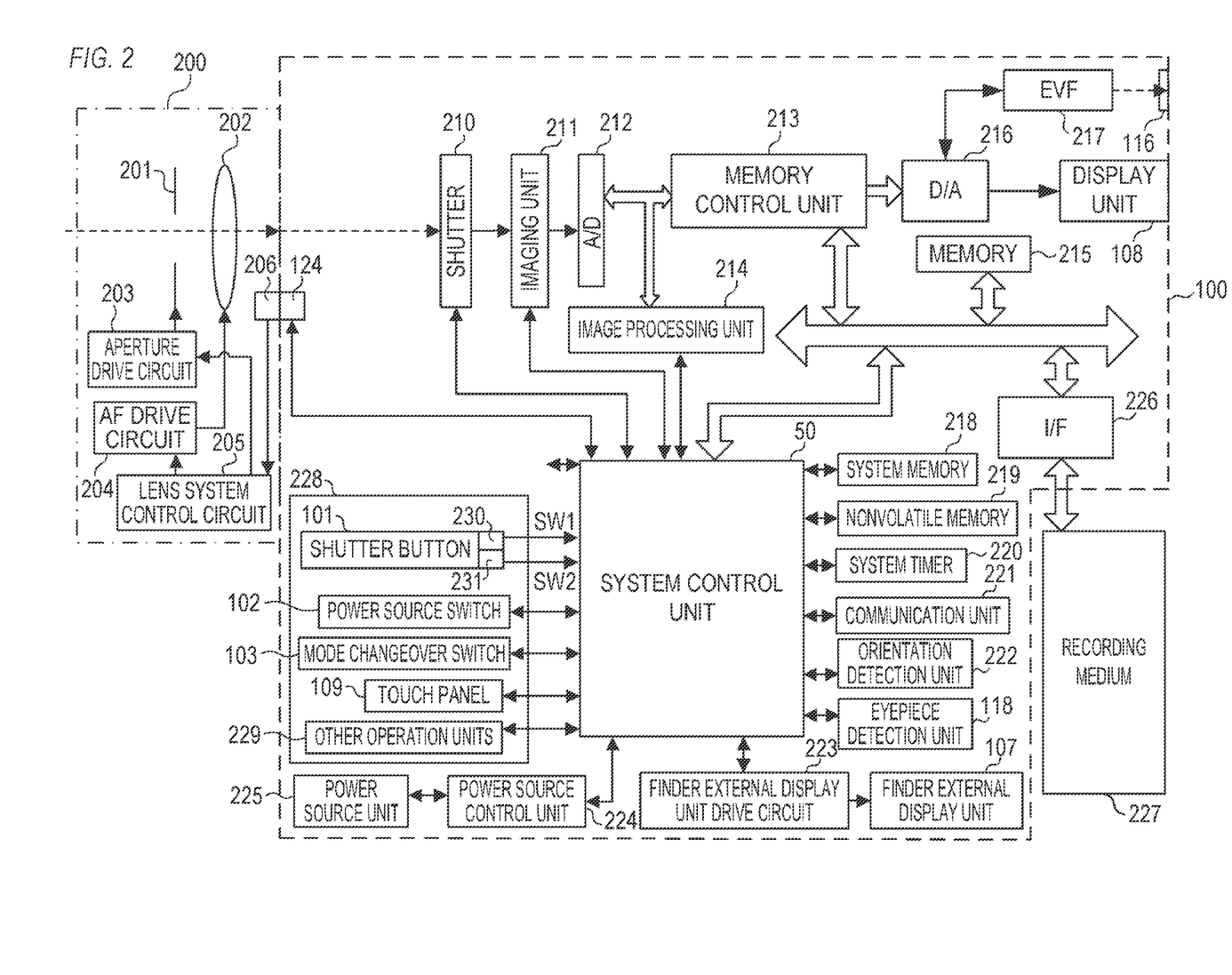
FIG. 2 is a block diagram showing the configuration of the camera.

FIG. 2 is a block diagram showing an example of the configuration of the camera 100. The same components as shown in FIGS. 1A and 1B are given the same reference numerals as in FIGS. 1A and 1B, and the description of such components will be omitted as appropriate. In FIG. 2, the lens unit 200 is attached on the camera 100.

First, the lens unit 200 will be explained. The lens unit 200 is a type of interchangeable lens unit that can be attached to and detached from the camera 100. The lens unit 200 is a single-eye lens unit and an example of a usual lens unit. The lens unit 200 has an aperture 201, a lens 202, an aperture drive circuit 203, an AF (autofocus) drive circuit 204, a lens system control circuit 205, a communication terminal 206, and the like.

The aperture 201 is configured so that the aperture diameter can be adjusted. The lens 202 is composed of a plurality of lenses. The aperture drive circuit 203 adjusts the quantity of light by controlling the aperture diameter of the aperture 201. The AF drive circuit 204 drives the lens 202 to focus. The lens system control circuit 205 controls an aperture drive circuit 203, an AF drive circuit 204, and the like based on instructions from a system control unit 50, which will be described hereinbelow. The lens system control circuit 205 controls the aperture 201 through the aperture drive circuit 203 and focuses by changing the position of the lens 202 through the AF drive circuit 204. The lens system control circuit 205 can communicate with the camera 100. Specifically, communication is performed via the communication terminal 206 of the lens unit 200 and the communication terminal 124 of the camera 100. The communication terminal 206 is for the lens unit 200 to communicate with the camera 100 side.

Next, the camera 100 will be explained. The camera 100 has a shutter 210, an imaging unit 211, an A/D converter 212, a memory control unit 213, an image processing unit 214, a memory 215, a D/A converter 216, an EVF 217, a display unit 108, and a system control unit 50.

The shutter 210 is a focal plane shutter that can freely control the exposure time of the imaging unit 211 based on instructions from the system control unit 50. The imaging unit 211 is an imaging element (image sensor) configured by a CCD, a CMOS device, or the like that converts an optical image into an electrical signal. The imaging unit 211 may have an imaging surface phase difference sensor that outputs defocus amount information to the system control unit 50. The A/D converter 212 converts the analog signal output from the imaging unit 211 into a digital signal. The image processing unit 214 performs predetermined processing (pixel interpolation, resizing such as reduction, color conversion, etc.) on the data from the A/D converter 212 or the data from the memory control unit 213. Further, the image processing unit 214 performs predetermined computational processing using captured image data, and the system control unit 50 performs exposure control and distance measurement control based on the obtained computation result. Through this processing, TTL (through-the-lens) AF processing, AE (auto exposure) processing, EF (flash pre-emission) processing, and the like are performed. Further, the image processing unit 214 performs predetermined arithmetic processing using the captured image data, and the system control unit 50 performs TTL AWB (auto white balance) processing based on the obtained computation results.

The image data from the A/D converter 212 are written into the memory 215 via the image processing unit 214 and the memory control unit 213. Alternatively, the image data from the A/D converter 212 are written to the memory 215 via the memory control unit 213 without passing through the image processing unit 214. The memory 215 stores image data obtained by the imaging unit 211 and converted into digital data by the A/D converter 212 and image data to be displayed on the display unit 108 and the EVF 217. The memory 215 has a storage capacity sufficient to store a predetermined number of still images and moving images and audio related to a predetermined period of time. The memory 215 also serves as an image display memory (video memory).

The D/A converter 216 converts the image data for display stored in the memory 215 into analog signals and supplies the converted data to the display unit 108 and the EVF 217. Therefore, the image data for display written in the memory 215 are displayed on the display unit 108 or the EVF 217 via the D/A converter 216. The display unit 108 and the EVF 217 perform display according to analog signals from the D/A converter 216. The display unit 108 and the EVF 217 are, for example, displays such as LCD and organic EL. The digital signal A/D converted by the A/D converter 212 and accumulated in the memory 215 is converted into an analog signal by the D/A converter 216 and transferred to be displayed on the display unit 108 or the EVF 217, whereby the live view display is performed.

The system control unit 50 is composed of at least one processor and/or at least one circuit. That is, the system control unit 50 may be a processor, a circuit, or a combination of a processor and a circuit. The system control unit 50 controls the entire camera 100. The system control unit 50 executes the programs recorded in the non-volatile memory 219 to realize each process of the flowcharts described hereinbelow. The system control unit 50 also performs display control by controlling the memory 215, the D/A converter 216, the display unit 108, the EVF 217, and the like.

The camera 100 also has a system memory 218, a non-volatile memory 219, a system timer 220, a communication unit 221, an orientation detection unit 222 and an eye proximity detection unit 118.

A RAM, for example, is used as the system memory 218. In the system memory 218, constants and variables for operation of the system control unit 50, programs read from the non-volatile memory 219, and the like are expanded. The non-volatile memory 219 is an electrically erasable/recordable memory, and an EEPROM, for example, is used as the non-volatile memory 219. Constants for operation of the system control unit 50, programs, and the like are recorded in the non-volatile memory 219. The program referred to herein is a program for executing a flowchart to be described hereinbelow. The system timer 220 measures the time used for various controls and the time of the built-in clock. The communication unit 221 transmits and receives video signals and audio signals to and from an external device connected wirelessly or by a wired cable. The communication unit 221 can be connected to a wireless LAN (Local Area Network) and the Internet. Also, the communication unit 221 can communicate with an external device using Bluetooth (registered trademark) or Bluetooth Low Energy.

The communication unit 221 can transmit images (including live images) captured by the imaging unit 211 and images recorded on the recording medium 227 and can receive images and other various types of information from external devices. The orientation detection unit 222 detects the orientation (inclination) of the camera 100 with respect to the direction of gravity. Based on the orientation detected by the orientation detection unit 222, the inclination angle of the camera 100 in the horizontal direction (left-right direction) or vertical direction (up-down direction; front-rear direction) can be detected. Also, based on the orientation detected by the orientation detection unit 222, it is possible to determine whether the image captured by the imaging unit 211 is an image captured with the camera 100 held horizontally or vertically. The system control unit 50 can add the orientation information corresponding to the orientation detected by the orientation detection unit 222 to the image file of the image captured by the imaging unit 211, or can rotate the image according to the detected orientation. The orientation detection unit 222 can also be used to detect the movement of the camera 100 (pan, tilt, lift, whether it is stationary, etc.). For example, an acceleration sensor, a gyro sensor, or the like can be used for the orientation detection unit 222.

The eye proximity detection unit 118 can detect the approach of any object to the eyepiece unit 116 (eyepiece finder 117). For example, an infrared proximity sensor can be used for the eye proximity detection unit 118. When an object approaches, the infrared rays projected from the light projecting unit of the eye proximity detection unit 118 are reflected by the object and received by the light receiving unit of the infrared proximity sensor. The distance from the eyepiece unit 116 to the object can be determined by the amount of received infrared rays. In this manner, the eye proximity detection unit 118 performs eye proximity detection for detecting the proximity distance of an object to the eyepiece unit 116. The eye proximity detection unit 118 detects approach (eye proximity) and detachment (eye detachment) of the eye (object) to and from the eyepiece unit 116. When an object approaches from an eye non-proximity state (non-proximity state) to a predetermined distance from the eyepiece unit 116, eye proximity is detected. Meanwhile, when the object that has been detected to be in close proximity moves away from the eye proximity state (proximity state), eye detachment is detected. A threshold for detecting eye proximity and a threshold for detecting eye detachment may be made different, for example, by providing hysteresis. Also, it is assumed that after the eye proximity is detected, the eye proximity state is maintained until the eye detachment is detected. It is further assumed that after the eye detachment is detected, the eye non-proximity state is maintained until the eye proximity is detected. The system control unit 50 switches display (display state)/non-display (non-display state) of the display unit 108 and the EVF 217 according to the state detected by the eye proximity detection unit 118. Specifically, during eye non-proximity, at least in the imaging standby state and when the switching setting of the display destination is automatic switching, the display destination is set to the display unit 108 and the display is turned on while the EVF 217 is set to the non-display state. In addition, during eye proximity, the display is turned on for EVF 217 as the display destination, and the display unit 108 is set to the non-display state. The eye proximity detection unit 118 is not limited to the infrared proximity sensor, and other sensors may be used as the eye proximity detection unit 118 as long as they can detect a state that can be regarded as eye proximity.

In addition, the camera 100 has the finder external display unit 107, a finder external display unit drive circuit 223, a power source control unit 224, a power source unit 225, a recording medium I/F 226, an operation unit 228, and the like.

The finder external display unit 107 is driven by the finder external display unit drive circuit 223 and displays various setting values of the camera 100, such as shutter speed and aperture. The power source control unit 224 includes a battery detection circuit, a DC-DC converter, a switch circuit for switching blocks to be energized, and the like, and the power source control unit 224 detects whether a battery is installed, the type of battery, and the remaining capacity of the battery. Also, the power source control unit 224 controls the DC-DC converter based on the detection results and instructions from the system control unit 50 and supplies necessary voltage to each unit, including the recording medium 227, for a necessary period. The power source unit 225 is a primary battery, such as an alkaline battery or a lithium battery; a secondary battery, such as a NiCd battery, a NiMH battery or a Li battery; an AC adapter; or the like. The recording medium I/F 226 is an interface with a recording medium 227, such as a memory card or hard disk. The recording medium 227 is a memory card or the like for recording captured images and is composed of a semiconductor memory, a magnetic disk, or the like. The recording medium 227 may be detachable from the camera 100 or may be built in the camera 100.

The operation unit 228 is an input unit that receives operations (user operations) from the user and is used to input various instructions to the system control unit 50. The operation unit 228 includes the shutter button 101, the power source switch 102, the mode changeover switch 103, the touch panel 109, other operation units 229, and the like. The other operation units 229 include the main electronic dial 104, the sub electronic dial 105, the moving image button 106, the direction key 110, the SET button 111, the AE lock button 112, the enlargement button 113, the playback button 114, the menu button 115, the touch bar 119, and the like.

The shutter button 101 has a first shutter switch 230 and a second shutter switch 231. The first shutter switch 230 is turned on when the shutter button 101 is being operated, that is, when the shutter button is half-pressed (imaging preparation instruction), and outputs a first shutter switch signal SW1. The system control unit 50 starts the imaging preparation operations, such as AF processing, AE processing, AWB processing, and EF processing, in response to the first shutter switch signal SW1. The second shutter switch 231 is turned ON when the operation of the shutter button 101 is completed, that is, when the shutter button is fully pressed (imaging instruction), and generates a second shutter switch signal SW2. In response to the second shutter switch signal SW2, the system control unit 50 starts a series of imaging processing operations from signal reading from the imaging unit 211 to generating an image file including the captured image and writing the generated image file on the recording medium 227.

The mode changeover switch 103 switches the operation mode of the system control unit 50 to one of a still imaging mode, a moving imaging mode, a playback mode, and the like. Modes included in the still imaging mode include auto imaging mode, auto scene discrimination mode, manual mode, aperture priority mode (Av mode), shutter speed priority mode (Tv mode), and program AE mode (P mode). In addition, there are various scene modes, custom modes, and the like, which are imaging settings for each imaging scene. The mode changeover switch 103 allows the user to switch directly between these modes. Also, after once switching to the list screen of imaging modes with the mode changeover switch 103, the user may perform selective switching to any one of the plurality of displayed modes by using the operation unit 228. Similarly, the moving imaging mode may also include multiple modes.

The touch panel 109 is a touch sensor that detects various touch operations on the display surface (the operation surface of the touch panel 109) of the display unit 108. The touch panel 109 and the display unit 108 can be configured integrally. For example, the touch panel 109 is attached to the upper layer of the display surface of the display unit 108 so that the light transmittance does not interfere with the display of the display unit 108. By associating the input coordinates on the touch panel 109 with the display coordinates on the display surface of the display unit 108, a GUI (graphical user interface) can be configured as if the user could directly operate the screen displayed on the display unit 108. The touch panel 109 can use any one of various methods, such as a resistive film method, an electrostatic capacitance method, a surface acoustic wave method, an infrared method, an electromagnetic induction method, an image recognition method, and an optical sensor method. Depending on the method used in the touch panel, there is a method of detecting that there is a touch when there is a contact with the touch panel 109, and a method of detecting that there is a touch when a finger or a pen approaches the touch panel 109. Either method can be used.

The system control unit 50 can detect the following operations or states on the touch panel 109.

A finger or pen that was not touching the touch panel 109 newly touches the touch panel 109, that is, touch is started (hereinafter referred to as Touch-Down).

A finger or pen is touching the touch panel 109 (hereinafter referred to as Touch-On).

A finger or pen is moved while being in touch with the touch panel 109 (hereinafter referred to as Touch-Move).

A finger or pen touching the touch panel 109 is separated (released) from the touch panel 109, that is, touch is ended (hereinafter referred to as Touch-Up).

Nothing is touching the touch panel 109 (hereinafter referred to as Touch-Off).

When Touch-Down is detected, Touch-On is also detected at the same time.

Unless Touch-Up is detected after Touch-Down, Touch-On is normally detected continuously. Where Touch-Move is detected as well, Touch-On is detected at the same time. Even if Touch-On is detected, Touch-Move is detected unless the touch position is not moving. Touch-Off is assumed when Touch-Up of all fingers or pen that have been touching is detected.

These operations, states, and positional coordinates of the fingers or pen touching the touch panel 109 are notified to the system control unit 50 via an internal bus. Based on the notified information, the system control unit 50 determines the kind of operation (touch operation) that has been performed on the touch panel 109. For Touch-Move, the moving direction of the fingers or pen moving on the touch panel 109 can also be determined for the vertical components and horizontal components of the touch panel 109 on the basis of the change in the positional coordinates. Where Touch-Move is detected for at least a predetermined distance, it is determined that a slide operation was performed. An operation of touching the touch panel 109 with a finger, quickly moving the finger touching the touch panel for a certain distance and then releasing the finger is called "flick". Flick is, in other words, an operation of quickly tracing the touch panel 109 as if flicking it with a finger. Where it is detected that Touch-Move has been performed for a predetermined distance or more at a predetermined speed or faster and then Touch-Up is detected, it is determined that flick was performed (it can be determined that flick has occurred following a slide operation). Further, a touch operation in which a plurality of points (for example, two points) is touched simultaneously (multi-touch) and the touch positions are brought closer together is called "pinch-in", and a touch operation in which the touch positions are moved away from each other is called "pinch-out". Pinch-out and pinch-in are collectively called a pinch operation (or simply "pinch").

Figure 3:
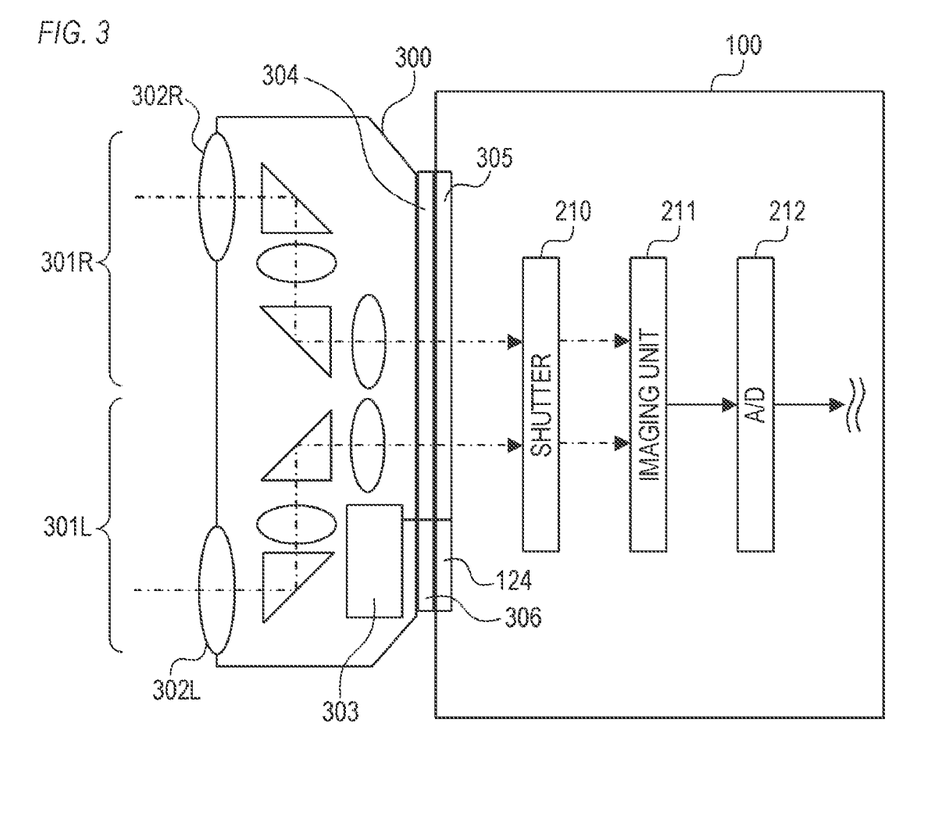
FIG. 3 is a schematic diagram showing the configuration of a lens unit.

FIG. 3 is a schematic diagram showing an example of the configuration of the lens unit 300. FIG. 3 shows a state in which the lens unit 300 is attached to the camera 100. As a result of attaching the lens unit 300, the camera 100 can capture one image (still image or moving image) including two image areas with a predetermined parallax. In the camera 100 shown in FIG. 3, the same components as those explained in FIG. 2 are denoted by the same reference numerals as in FIG. 2, and the explanation of those components is omitted as appropriate.

The lens unit 300 is a type of interchangeable lens unit that can be attached to and detached from the camera 100. The lens unit 300 is a twin-eye lens unit capable of capturing right and left images with parallax. The lens unit 300 has two optical systems, and each of the two optical systems can capture a wide viewing angle range of approximately 180 degrees. Specifically, each of the two optical systems of the lens unit 300 can capture an image of an object with a field of view (angle of view) of 180 degrees in the left-right direction (horizontal angle, azimuth angle, yaw angle) and 180 degrees in the up-down direction (vertical angle, elevation angle, pitch angle). That is, each of the two optical systems can capture an image in the range of the anterior hemisphere.

The lens unit 300 has a right-eye optical system 301R having a plurality of lenses, reflecting mirrors, and the like, a left-eye optical system 301L having a plurality of lenses, reflecting mirrors, and the like, and a lens system control circuit 303. The right-eye optical system 301R has a lens 302R arranged on the object side, and the left-eye optical system 301L has a lens 302L arranged on the object side. The lenses 302R and 302L face the same direction, and optical axes thereof are substantially parallel.

The lens unit 300 may be a twin-eye lens unit (VR180 lens unit) for obtaining a VR180 image, which is one of VR (Virtual Reality) image formats capable of binocular stereoscopic vision. The lens unit 300 has a fisheye lens capable of capturing a range of approximately 180 degrees in each of the right-eye optical system 301R and the left-eye optical system 301L. The range that can be captured by the lenses of the right-eye optical system 301R and the left-eye optical system 301L may be about 160 degrees, which is narrower than the range of 180 degrees. The lens unit 300 can form a right image formed via the right eye optical system 301R and a left image formed via the left eye optical system 301L on one imaging element of the camera on which the lens unit 300 has been attached.

The lens unit 300 is attached on the camera 100 via a lens mount section 304 and a camera mount section 305 of the camera 100. By doing so, the system control unit 50 of the camera 100 and the lens system control circuit 303 of the lens unit 300 are electrically connected via the communication terminal 124 of the camera 100 and a communication terminal 306 of the lens unit 300.

In FIG. 3, a right image formed through the right eye optical system 301R and a left image formed through the left eye optical system 301L are formed side by side on the imaging unit 211 of the camera 100. That is, the right-eye optical system 301R and the left-eye optical system 301L respectively form two regions on one imaging element (imaging sensor). The imaging unit 211 converts the formed object image (optical signal) into an analog electrical signal. By using the lens unit 300 in this way, one image including two image areas with parallax can be acquired from two locations (optical systems) of the right-eye optical system 301R and the left-eye optical system 301L. By dividing the obtained image into an image for the left eye and an image for the right eye and performing VR display of the two images, the user can view a stereoscopic VR image within a range of approximately 180 degrees. That is, the user can stereoscopically view the image of the VR180.

Here, the VR image is an image capable of VR display, which will be described hereinbelow. The VR images are inclusive of an omnidirectional image (entire-sphere image) captured by an omnidirectional camera (entire-sphere camera), a panoramic image with a video range (effective video range) wider than the display range that can be displayed on the display unit all at once, and the like. The VR image is not limited to a still image and is inclusive of a moving image and a live image (image acquired from a camera almost in real time). The VR image has a maximum video range (effective video range) of 360 degrees in the left-right direction and 360 degrees in the up-down direction. In addition, the VR image is also inclusive of an image having an angle of view that is wider than an angle of view that can be captured by a standard camera even if it is less than 360 degrees in the left-right direction and less than 360 degrees in the up-down direction, or having a video range wider than the display range that can be displayed all at once on the display unit. An image captured by the camera 100 using the above-described lens unit 300 is a kind of VR image. VR display of a VR image can be performed by, for example, setting the display mode of a display device (a display device capable of displaying a VR image) to "VR view". Where a partial range of a VR image having a 360-degree angle of view is displayed, by changing the orientation of the display device in the left-right direction (horizontal rotation direction), the user can move the displayed range and enjoy omnidirectional images seamless in the left-right direction.

VR display (VR view) is a display method (display mode) in which, in a VR image, video within a viewing range corresponding to the orientation of the display device is displayed and the display range can be changed. The VR display is inclusive of a "single-eye VR display" (single-eye VR view) in which one image is displayed by performing transformation (distortion correction) by mapping a VR image onto a virtual sphere. The VR display is also inclusive of a "twin-eye VR display" (twin-eye VR view) in which a VR image for the left eye and a VR image for the right eye are each transformed by mapping onto a virtual sphere and displayed side by side in the left and right regions. By performing "twin-eye VR display" using a VR image for the left eye and a VR image for the right eye that have parallax with each other, it is possible to stereoscopically view these VR images. In any VR display, for example, when a user wears a display device such as an HMD (head-mounted display), a video image within a viewing range corresponding to the orientation of the user's face is displayed. For example, of the VR image, at a certain point in time, a video image of the viewing range centered at 0 degrees in the left-right direction (a specific direction, such as north) and 90 degrees in the up-down direction (90 degrees from the zenith, that is, horizontal) is displayed. Where the orientation of the display device is front-back reversed from this state (for example, the display surface is changed from facing south to facing north), in the same VR image, the display range is changed to the video image of the viewing range centered at 180 degrees in the left-right direction (opposite orientation, for example, south) and 90 degrees in the up-down direction. That is, when the user wears an HMD and turns his/her face from north to south (that is, turns back), the video image displayed on the HMD is also changed from the north video image to the south video image. The VR image captured using the lens unit 300 is an image (180° image) captured in a range of approximately 180 degrees forward, and there is no image in a range of approximately 180 degrees backward. When VR display of such an image is performed and the orientation of the display device is changed to the side where no video image is present, a blank area is displayed.

By performing VR display of a VR image in this way, the user can visually feel (feeling of immersion) as if he/she is inside the VR image (inside the VR space). The display method of the VR image is not limited to the method of changing the orientation of the display device. For example, the display range may be moved (scrolled) in response to a user operation performed via a touch panel, direction buttons, or the like. In addition, at the time of VR display (when the display mode is "VR view"), in addition to the change in the display range due to a change in orientation, the display range may be moved according to touch moves on the touch panel, drag operations with a mouse etc., pressing direction buttons, and the like. A smartphone attached on VR goggles (head mount adapter) is a kind of HMD.

Figure 4:
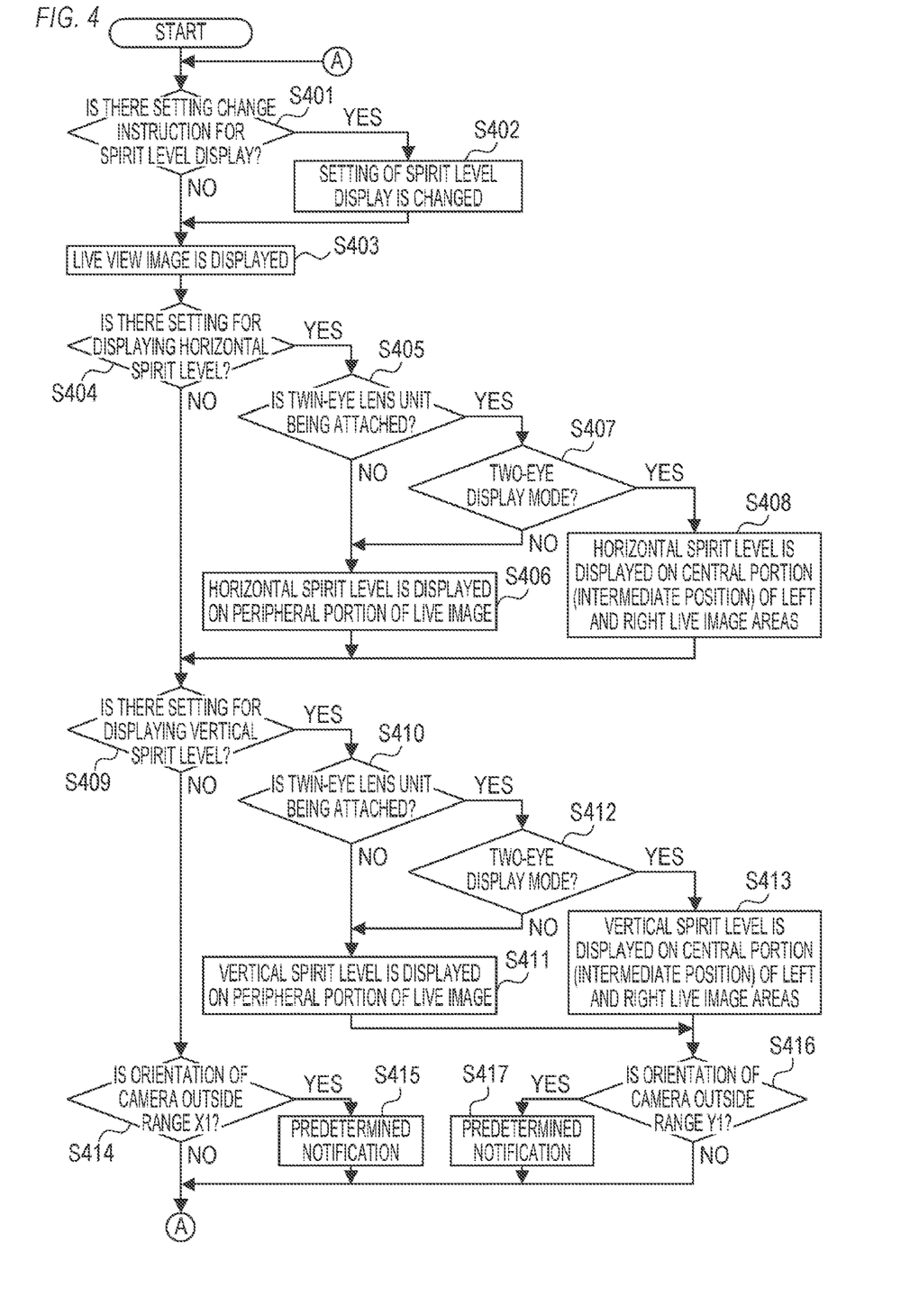
FIG. 4 is a flowchart showing the operation of the camera.

FIG. 4 is a flowchart showing an example of the operation (imaging mode processing) of the camera 100 in an imaging mode such as a still image imaging mode and moving image imaging mode. This operation is realized by the system control unit 50 expanding the program recorded in the non-volatile memory 219 into the system memory 218 and executing the program. For example, where the camera 100 is activated in the imaging mode, or the mode of the camera 100 is switched to the imaging mode, the operation of FIG. 4 starts. In the following, it is assumed that the display is performed on the display unit 108, but the following display may be performed on the EVF 217 as well.

In step S401, the system control unit 50 determines whether there is an instruction to change the setting of whether to display a spirit level (an item indicating the orientation of the camera 100 detected by the orientation detection unit 222) on the display unit 108. The number of spirit levels, the direction of the orientation indicated by the spirit levels, and the like are not particularly limited, but it is assumed that a horizontal spirit level (a spirit level indicating the orientation of the camera 100 in the horizontal direction) and a vertical spirit level (a spirit level indicating the orientation of the camera 100 in the vertical direction) can be displayed. Whether to display the horizontal spirit level and whether to display the vertical spirit level may be set collectively or individually. The user can use the touch panel 109, the sub electronic dial 105, the direction key 110, the SET button 111, and the like to instruct to change the setting as to whether to display the spirit level. Where it is determined that there is an instruction to change the setting, the process proceeds to step S402; otherwise, the process proceeds to step S403.

In step S402, the system control unit 50 changes the setting as to whether to display the spirit level by changing the setting value (setting value for whether to display the spirit level) stored in the non-volatile memory 219.

Figure 5A:
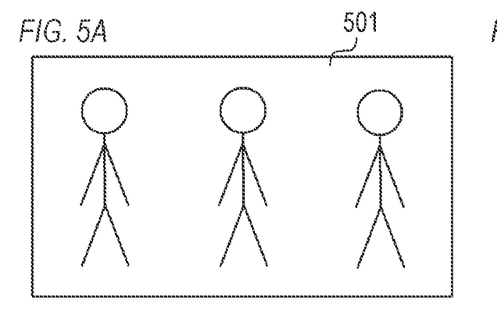
FIGS. 5A to 5G are schematic diagrams of a display screen.
Figure 5B:
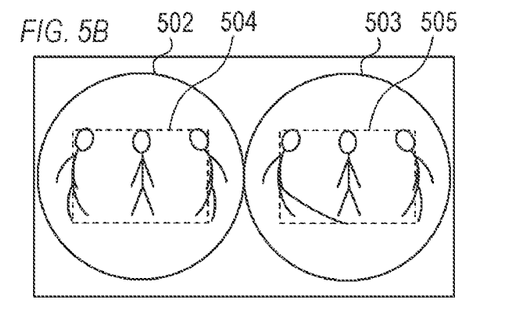

In step S403, the system control unit 50 displays a live image captured by the imaging unit 211 on the display unit 108 as a live view image. When the single-eye lens unit 200 is attached on the camera 100, one live image 501 is displayed so that the central portion of the live image 501 is positioned in the central portion of the display surface of the display unit 108, as shown in FIG. 5A. When the twin-eye lens unit 300 is attached on the camera 100, any one of a plurality of modes including a twin-eye display mode and a single-eye display mode can be set. When the twin-eye display mode is set, as shown in FIG. 5B, a single live image in which a left live image area 502 captured using the left eye optical system 301L and a right live image area 503 captured using the right eye optical system 301R are displayed side by side in the left-right direction is displayed. The left live image area 502 and the right live image area 503 are circular fisheye images of round shape, and the distortion of the object in the live image is greater the closer to the edges of these areas. Rectangular dashed lines 504 and 505 shown in FIG. 5B indicate areas for VR display (single-eye VR display or twin-eye VR display). Frames, such as dashed lines 504 and 505, may or may not be displayed. When the single-eye display mode is set, the left live image area 502 or the right live image area 503 is clipped out of the live image and displayed. The left live image area 502 or the right live image area 503 may be displayed as a circular fisheye image, or single-eye VR display of a rectangular area shown by the dashed line 504 or the dashed line 505 may be performed. In the single-eye VR display, a rectangular image is displayed on the entire display surface of the display unit 108 in the same manner as in FIG. 5A.

In step S404, the system control unit 50 reads the setting value as to whether to display the horizontal spirit level from the non-volatile memory 219 and determines whether to display the horizontal spirit level. Where it is determined to display the horizontal spirit level, the process proceeds to step S405; otherwise, the process proceeds to step S409.

In step S405, the system control unit 50 determines whether the twin-eye lens unit 300 is attached on the camera 100. The system control unit 50 communicates with the lens system control circuit (205 or 303) of the lens unit via the communication terminal 124 of the camera and the communication terminal (206 or 306) of the attached lens unit. Through this communication, the system control unit 50 acquires information about the type of the lens unit (for example, information indicating the type, such as the model name and serial number of the lens unit) from the attached lens unit. Based on the information thus acquired, the system control unit 50 can determine whether the twin-eye lens unit 300 is attached to the camera 100. Where it is determined that the twin-eye lens unit 300 is attached, the process proceeds to step S407; otherwise (if it is determined that the single-eye lens unit 200 is attached), the process proceeds to step S406.

Figure 5C:
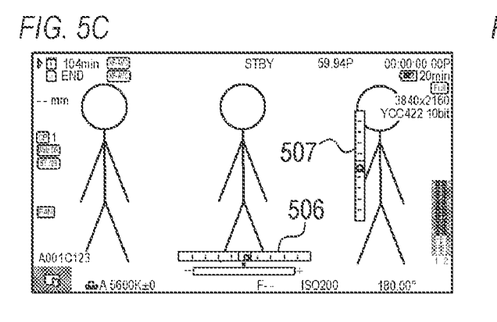

In step S406, the system control unit 50 superimposes and displays the horizontal spirit level on the peripheral portion of one live image composed of one image area acquired through one optical system, that is, on the peripheral portion of the display surface of the display unit 108. For example, as shown in FIG. 5C, a horizontal spirit level 506 is superimposed and displayed on the center of the lower end portion (lower end portion of the display surface) of the live image 501.

In step S407, the system control unit 50 reads the setting value indicating whether the twin-eye display mode is set from the non-volatile memory 219 and determines whether the twin-eye display mode is set. Where it is determined that the twin-eye display mode has been set, the process proceeds to step S408; otherwise (where it is determined that the single-eye display mode is set), the process proceeds to step S406.

Figure 5D:
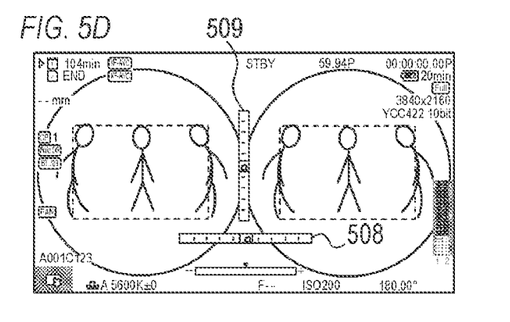

In step S408, the system control unit 50 superimposes and displays the horizontal spirit level on the central portions of the right live image area and the left live image area in one live image. For example, as shown in FIG. 5D, a horizontal spirit level 508 is superimposed and displayed on an intermediate position between the left live image area 502 and the right live image area 503, that is, at the center of the lower end portion of the entire live image. The spirit level 508 in FIG. 5D is displayed above the spirit level 506 in FIG. 5C. That is, the spirit level 506 in FIG. 5C is displayed below the spirit level 508 in FIG. 5D. As a result, it is possible to reduce the possibility that the spirit level is superimposed and displayed on the main object in one live image made up of one rectangular image area as shown in FIG. 5C.

In this way, the horizontal spirit level is displayed at different positions in the live image depending on whether the twin-eye lens unit 300 is attached on the camera 100. Specifically, the horizontal spirit level is displayed at different positions depending on whether the right live image area and the left live image area are displayed side by side in the live image (whether the twin-eye display mode is set). In addition, in the case where the twin-eye lens unit 300 is attached on the camera 100, the display in the twin-eye display mode may be performed at all times. Also in this case, the horizontal spirit level is displayed at different positions depending on whether the twin-eye lens unit 300 is attached on the camera 100.

In step S409, the system control unit 50 reads the setting value as to whether to display a vertical spirit level from the non-volatile memory 219 and determines whether to display the vertical spirit level. Where it is determined to display the vertical spirit level, the process proceeds to step S410; otherwise, the process proceeds to step S414.

In step S410, the system control unit 50 determines whether the twin-eye lens unit 300 is attached on the camera 100. Where it is determined that the twin-eye lens unit 300 is attached, the process proceeds to step S412, otherwise (where it is determined that the single-eye lens unit 200 is attached), the process proceeds to step S411.

In step S411, the system control unit 50 superimposes and displays the vertical spirit level on the peripheral portion of the live image, that is, the peripheral portion of the display surface of the display unit 108. For example, as shown in FIG. 5C, a vertical spirit level 507 is displayed in the right end portion of the live image 501 (the right end portion of the display surface).

In step S412, the system control unit 50 reads the setting value indicating whether the twin-eye display mode is set from the non-volatile memory 219 and determines whether the twin-eye lens display mode is set. Where it is determined that the twin-eye display mode is set, the process proceeds to step S413; otherwise (where it is determined that the single-eye display mode is set), the process proceeds to step S411.

In step S413, the system control unit 50 superimposes and displays the vertical spirit level on the central portion of one live image consisting of the right live image area and the left live image area. For example, as shown in FIG. 5D, a vertical spirit level 509 is superimposed and displayed at an intermediate position between the left live image area 502 and the right live image area 503.

In this way, the vertical spirit level is displayed at different positions in the live image depending on whether the twin-eye lens unit 300 is attached on the camera 100. Specifically, the vertical spirit level is displayed at different positions depending on whether the right live image area and the left live image area are displayed side by side in the live image (whether the twin-eye display mode is set). In addition, in the case where the twin-eye lens unit 300 is attached on the camera 100, the display in the twin-eye display mode may be performed at all times. Also in this case, the vertical spirit level is displayed at different positions depending on whether the twin-eye lens unit 300 is attached on the camera 100.

In step S414, the system control unit 50 determines whether the orientation of the camera 100 detected by the orientation detection unit 222 is outside a range X1 (outside the predetermined range; outside the first range). For example, the system control unit 50 acquires the tilt angle of the camera 100 in the horizontal direction and the tilt angle of the camera 100 in the vertical direction from the orientation detection unit 222. The tilt angle in the horizontal direction is assumed to be 0 when the camera 100 is tilted neither to the right nor to the left, to have positive value when the camera is tilted to the right, and to have a negative value when the camera is tilted to the left. The tilt angle in the vertical direction is assumed to be 0 when the camera 100 is neither tilted upward (backward) nor downward (forward), to have a positive value when the camera is tilted upward, and to have a negative value when the camera is tilted downward. The system control unit 50 determines whether at least one of the absolute value of the tilt angle in the horizontal direction and the absolute value of the tilt angle in the vertical direction is greater than a threshold X2. In a state in which at least one of the absolute value of the tilt angle in the horizontal direction and the absolute value of the tilt angle in the vertical direction is larger than the threshold X2, the orientation of the camera 100 is outside the range X1. Where it is determined that the orientation of the camera 100 is outside the range X1, the process proceeds to step S415; otherwise, the process proceeds to step S401.

Figure 5E:
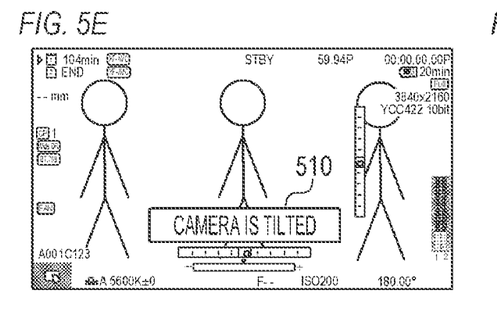

In step S415, the system control unit 50 issues a predetermined notification to the user. For example, as shown in FIG. 5E, the system control unit 50 displays a warning message 510 on the display unit 108 to the effect that the camera 100 is tilted. This allows the user to notice the tilt of camera 100. The notification method (notification control) is not particularly limited, and notification (warning) may be performed by changing the color of the spirit level, changing the display pattern of the spirit level (constant display, blinking display, etc.), displaying an icon, and the like. Notification may be made using a lamp, a speaker, or the like.

In step S416, the system control unit 50 determines whether the orientation of the camera 100 detected by the orientation detection unit 222 is outside a range Y1 (outside the predetermined range; outside the second range). For example, the system control unit 50 determines whether at least one of the absolute value of the tilt angle in the horizontal direction and the absolute value of the tilt angle in the vertical direction is greater than a threshold Y2. In a state in which at least one of the absolute value of the tilt angle in the horizontal direction and the absolute value of the tilt angle in the vertical direction is larger than the threshold Y2, the orientation of the camera 100 is outside the range Y1. Where it is determined that the orientation of the camera 100 is outside the range Y1, the process proceeds to step S417; otherwise, the process proceeds to step S401.

Figure 5F:
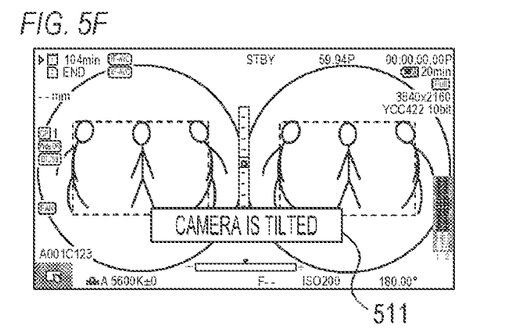

In step S417, the system control unit 50 issues a predetermined notification to the user. For example, as shown in FIG. 5F, the system control unit 50 displays a warning message 511 on the display unit 108 to the effect that the camera 100 is tilted. The notification method (notification control) is not particularly limited.

It is important not to tilt the camera 100 when imaging with the twin-eye lens unit. Therefore, it is preferable that the orientation range Y1 when the twin-eye lens unit is attached be narrower than the orientation range X1 when the twin-eye lens unit is not attached, that is, the threshold Y2 be smaller than the threshold X2. Where the ranges X1 and Y1 (thresholds X2 and Y2) are set in such a manner, even if the orientation of the camera 100 is within the range X1 (within the first range) when the twin-eye lens unit is attached, a predetermined notification is issued if the orientation is outside the range Y1 (outside the second range). Therefore, when the twin-eye lens unit is attached, the user can easily notice the inclination of the camera 100.

Further, the range Y1 is preferably the range of orientations in which tilt correction (zenith correction; horizontal and vertical correction) can be performed without deterioration in image quality in the image editing process after imaging, for example, the maximum range of orientations in which tilt correction can be performed without deterioration in image quality. In other words, the threshold Y2 is preferably the tilt angle (absolute value) at which tilt correction is possible without deterioration in image quality, for example, the maximum tilt angle (absolute value) at which tilt correction is possible without deterioration in image quality. By setting the range Y1 (threshold Y2) in such a manner, when the twin-eye lens unit is attached, the user can easily notice that the orientation of the camera 100 is within the range of orientations that allow tilt correction without deterioration in image quality. The same applies to the range X1 (threshold X2).

As described above, according to the first embodiment, in the live image, the spirit level is displayed at different positions depending on whether the twin-eye lens unit 300 is attached on the camera 100. By doing so, the spirit level can be displayed at a suitable position both when the twin-eye lens unit 300 is attached on the camera 100 and when it is not. For example, when the twin-eye lens unit 300 is attached on the camera 100 and one live image in which a right live image area and a left live image area are arranged side by side is displayed, the spirit level is displayed in the central portion of the live image consisting of the right live image area and the left live image area. Otherwise, the spirit level is displayed in the peripheral portion of the live image. By doing so, in either case, the user can visually recognize the live image with good visibility and ascertain the tilt of the camera 100 with the spirit level. Further, the spirit level is displayed at a position near both the right live image area and the left live image area. Therefore, the moving amount of the line of sight when comparing the spirit level with the right live image area or the left live image area can be reduced, and the user can easily compare the spirit level with the right live image area or the left live image area.

An example of displaying a spirit level at an intermediate position between the right live image area and the left live image area (a position where the distance to the right live image area is equal to the distance to the left live image area) has been described, but the spirit level may be shifted from the intermediate position. For example, the spirit level may be displayed between regions for VR display (rectangular areas indicated by broken lines 504 and 505 in FIG. 5B; VR display area) respectively included in the right live image area and the left live image area, at a position that is not superimposed on the VR display area. Where the spirit level is not superimposed on the VR display area, the user can visually recognize the VR display area with good visibility. Further, where the spirit level is superimposed on the right live image area or the left live image area, it is preferable that the surface area of superimposition be small. The user can view the live image with higher visibility as the surface area of the spirit level superimposed on the right live image area or the left live image area is smaller. When the display position of the level is changed by attaching or detaching the twin-eye lens unit, where the spirit level is superimposed on a specific object, the display position of the spirit level may be automatically adjusted to a position where the spirit level is not superimposed on the specific object. This ensures that the spirit level does not block the visibility of the specific object.

In addition, an example in which the horizontal spirit level and the vertical spirit level are displayed separately has been described, but a single spirit level in which the horizontal spirit level and the vertical spirit level are integrated may also be displayed. The number of spirit levels, the direction of the orientation indicated by the spirit levels, and the like are not particularly limited.

Further, an example in which the compound-eye lens unit including a plurality of optical systems is a twin-eye lens unit including two optical systems has been described, but the compound-eye lens unit is not limited to the twin-eye lens unit. The compound-eye lens unit may include three or more optical systems.

In the above description, an example has been described in which two optical images are respectively formed in two areas of one imaging element, and one image including two image areas with parallax is displayed as a live image, but such a configuration is not limiting. For example, when the camera 100 has two imaging elements, by using the lens unit 300, two images with parallax can be acquired at the same time (in a set) from two locations (optical systems) of the right-eye optical system 301R and the left-eye optical system 301L. The two live images may be arranged side by side and displayed on one display surface. In this case, a horizontal spirit level is displayed in the central portion of the image group consisting of the right live image and the left live image, and a vertical spirit level is displayed in the central portion of the image group consisting of the right live image and the left live image.

Figure 5G:
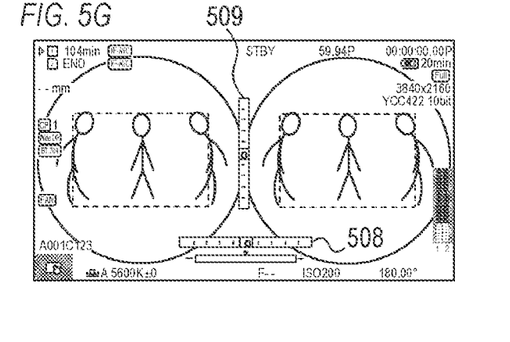

Also, the horizontal spirit level may be displayed at the same position regardless of the type of lens unit (number of optical systems) attached on the camera. As shown in FIG. 5G, when the left live image area 502 and the right live image area 503 are circular fisheye images, the lower end portion is a non-image portion. Therefore, where the horizontal spirit level 508 is located on the lower side like the spirit level 506 in FIG. 5C, a portion superimposed on the circular fisheye image becomes small, as shown in FIG. 5G, and the visibility increases. That is, depending on the direction of the spirit level, the spirit level may be displayed at different positions depending on the type of lens unit attached on the camera, or the spirit level may be displayed at the same position regardless of the type of lens unit attached on the camera.

Second Embodiment

A second embodiment will be described hereinbelow. Since the camera and lens unit according to the second embodiment are the same as those of the first embodiment (FIGS. 1A to 3), the description thereof will be omitted. The second embodiment differs from the first embodiment (FIG. 4) in imaging mode processing.

Figure 6:
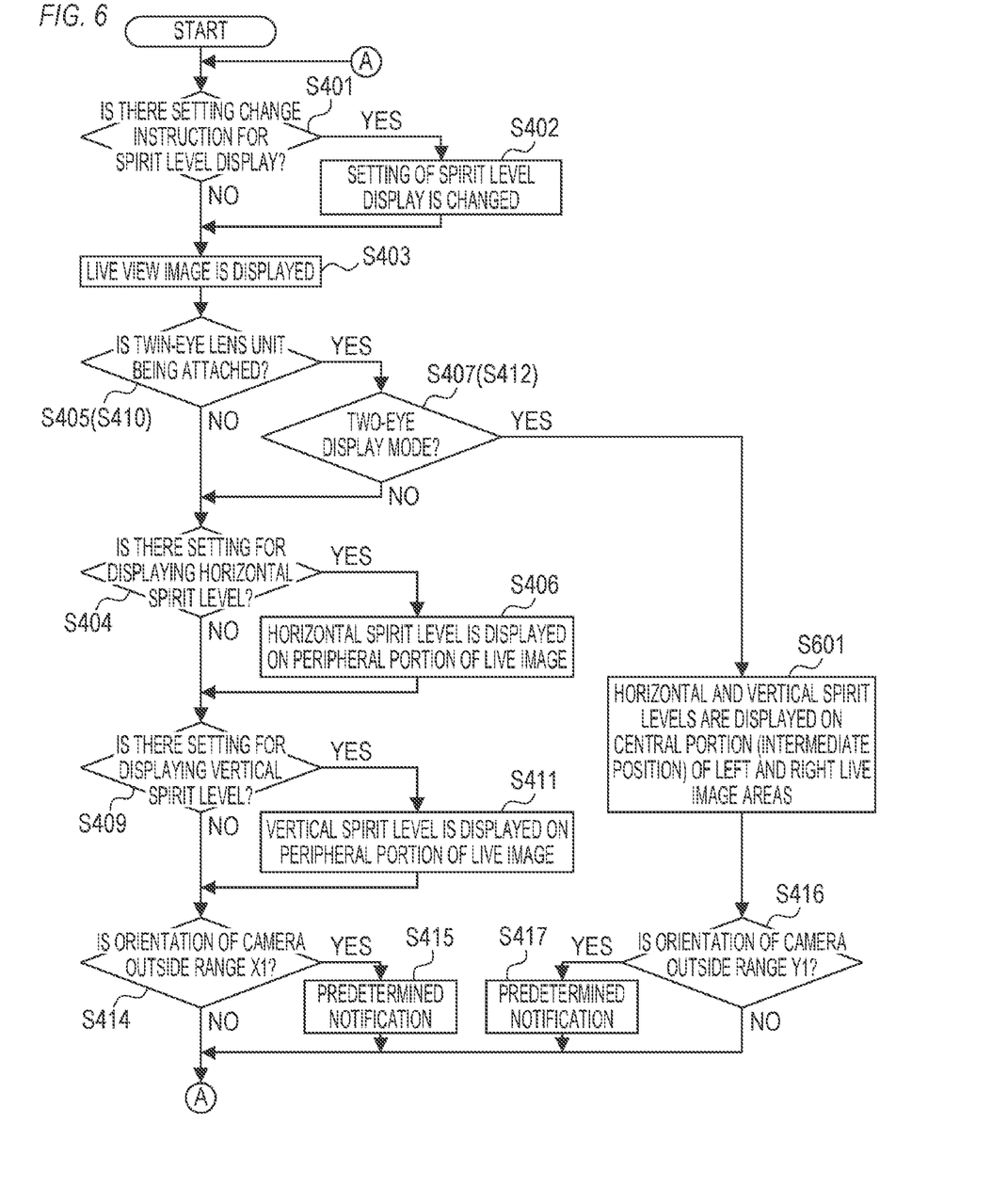
FIG. 6 is a flowchart showing the operation of the camera.

FIG. 6 is a flowchart showing an example of imaging mode processing according to the second embodiment. The operations shown in FIG. 6 are realized by the system control unit 50 expanding the program recorded in the non-volatile memory 219 into the system memory 218 and executing the program. For example, when the camera 100 is activated in the imaging mode or the mode of the camera 100 is switched to the imaging mode, the operation of FIG. 6 starts. In FIG. 6, the same steps as those in FIG. 4 (first embodiment) are given the same reference numerals as in FIG. 4, and the description thereof will be omitted.

In step S601, the system control unit 50 displays both the horizontal spirit level and the vertical spirit level in the central portion of the live image consisting of the right live image area and the left live image area.

As described above, according to the second embodiment, when the twin-eye lens unit 300 is attached (specifically, when the twin-eye lens unit is attached and the twin-eye display mode is set), the spirit level is displayed regardless of the setting as to whether to display the spirit level. In other words, the spirit level is displayed even if it is set not to be displayed. By doing so, it is possible to save the user the trouble of setting the display of the spirit level when the twin-eye lens unit 300 is attached. As a result, the user can easily check the orientation of the camera 100 with the spirit level when imaging with the twin-eye lens unit 300 for which it is important not to tilt the camera 100.

In the second embodiment, an example has been described in which the spirit level is displayed at all times (regardless of the setting as to whether to display the spirit level) when the twin-eye lens unit is attached, but such a configuration is not limiting. The setting may be automatically changed to display the spirit level in response to the attaching of the twin-eye lens unit, or the attaching of the twin-eye lens unit and the setting of the twin-eye display mode. This also allows the user to easily check the orientation of the camera 100 with the spirit level when imaging using the twin-eye lens unit 300. After automatically changing the setting to display the spirit level, it may be possible to manually change the setting to not display the spirit level. By doing so, convenience is improved. Where the user changes the setting to not display the spirit level after the setting has been automatically changed to display the spirit level, the spirit level will not be displayed (even if the twin-eye lens unit is being attached or in the twin-eye display mode). In this way, when imaging with the twin-eye lens unit 300, the user can switch display/non-display of the spirit level according to his/her preference.

The various controls described above that are performed by the system control unit 50 may be performed by one piece of hardware, or the entire device may be controlled by a plurality of pieces of hardware (for example, a plurality of processors or circuits) sharing the processing.

Moreover, although the present disclosure has been described in detail based on example embodiments thereof, some embodiments are not limited to these specific embodiments, and various forms within the scope of the present disclosure are included in the present disclosure as well. Furthermore, each embodiment described above merely shows one embodiment of the present disclosure, and it is also possible to combine the embodiments as appropriate.

In addition, the present disclosure is not limited to cameras, and can be applied to any imaging apparatus capable of attaching and detaching a lens unit. For example, the present disclosure can be applied to PDAs, mobile phone terminals, portable image viewers, printers, digital photo frames, music players, game machines, electronic book readers, and the like. In addition, the present disclosure can be applied to video players, display devices (including projection devices), tablet terminals, smart phones, AI speakers, home appliances, vehicle-mounted devices, and the like.

According to the present disclosure, an item indicating the tilt of an imaging apparatus can be displayed at a suitable position both when a lens unit including a plurality of optical systems is attached on the imaging apparatus and when it is not attached on the imaging apparatus.

OTHER EMBODIMENTS

Some embodiment(s) of the present disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that some embodiments are not limited to the disclosed exemplary embodiments. The scope of the following claims is to be accorded the broadest interpretation so as to encompass all such modifications and equivalent structures and functions.

This application claims priority to Japanese Patent Application No. 2021-209073, which was filed on Dec. 23, 2021 and which is hereby incorporated by reference herein in its entirety.

What is claimed is:

1. An imaging apparatus capable of attaching and detaching a lens unit, the imaging apparatus comprising:
   a processor; and
   a computer-readable medium storing instructions which, when executed by the processor, cause the imaging apparatus to
   detect a tilt of the imaging apparatus,
   acquire information on a type of the lens unit attached on the imaging apparatus, perform control to display an image captured using an optical system of the lens unit on a screen, and perform control to superimpose and display an item indicating the detected tilt on the image based on the acquired information, wherein the item is displayed at different positions depending on whether the lens unit includes a plurality of optical systems.

2. The imaging apparatus according to claim 1, wherein the item is displayed at different positions depending on whether the image includes a plurality of image areas captured respectively using the plurality of optical systems of the lens unit.

3. The imaging apparatus according to claim 1, wherein any one of a plurality of modes including a first mode in which a plurality of image areas captured respectively using the plurality of optical systems of the lens unit are displayed side by side, and a second mode in which any one of the plurality of image areas is displayed is settable, and the item is displayed at different positions depending on whether the first mode is set.

4. The imaging apparatus according to claim 1, wherein in a case where the lens unit includes the plurality of optical systems, the item is displayed in a central portion of an image composed of a plurality of image areas captured respectively using the plurality of optical systems of the lens unit.

5. The imaging apparatus according to claim 1, wherein in a case where the lens unit does not include a plurality of optical systems, the item is displayed in a peripheral portion of an image captured using one optical system of the lens unit.

6. The imaging apparatus according to claim 1, wherein it is possible to set whether to display the item, and in a case where the lens unit includes a plurality of optical systems, the item is displayed even if the item is set not to be displayed.

7. The imaging apparatus according to claim 1, wherein the item includes a first item indicating a tilt of the imaging apparatus in a first direction and a second item indicating a tilt of the imaging apparatus in a second direction different from the first direction;

the first item is displayed at different positions depending on whether the lens unit including the plurality of optical systems is attached; and the second item is displayed at a same position regardless of whether the lens unit including the plurality of optical systems is attached.

8. The imaging apparatus according to claim 1, wherein a plurality of optical images is formed on a plurality of areas of one imaging sensor by the plurality of optical systems of the lens unit.

9. The imaging apparatus according to claim 1, wherein when the instructions are executed by the processor, the processor further causes the imaging apparatus to perform control so that a predetermined notification is issued in a case where the detected tilt is outside a predetermined range.

10. The imaging apparatus according to claim 9, wherein if the detected tilt is outside a first range in a case where the lens unit does not include a plurality of optical systems, the control is performed to issue the predetermined notification, and if the detected tilt is inside the first range and outside a second range that is narrower than the first range in a case where the lens unit includes a plurality of optical systems, the control is performed to issue the predetermined notification.

11. The imaging apparatus according to claim 1, wherein each of the plurality of optical systems of the lens unit includes a fisheye lens.

12. The imaging apparatus according to claim 1, wherein the lens unit including the plurality of optical systems is a twin-eye lens unit including two optical systems.

13. The imaging apparatus according to claim 12, wherein the item is displayed between ranges for VR display respectively included in two image areas captured using the two optical systems.

14. A control method of an imaging apparatus capable of attaching and detaching a lens unit, the control method comprising:

detecting a tilt of the imaging apparatus;

acquiring information on a type of the lens unit attached on the imaging apparatus;

performing control to display an image captured using an optical system of the lens unit on a screen; and performing control to superimpose and display an item indicating the detected tilt on the image based on the acquired information, wherein the item is displayed at different positions depending on whether the lens unit includes a plurality of optical systems.

15. A non-transitory computer-readable medium that stores computer-executable instructions, wherein the computer-executable instructions cause a computer to execute a control method of an imaging apparatus capable of attaching and detaching a lens unit, the control method comprising:

detecting a tilt of the imaging apparatus;

acquiring information on a type of the lens unit attached on the imaging apparatus;

performing control to display an image captured using an optical system of the lens unit on a screen; and performing control to superimpose and display an item indicating the detected tilt on the image based on the acquired information, and the item is displayed at different positions depending on whether the lens unit includes a plurality of optical systems.

* * * * *